Sept. 23, 1941.   D. J. STEWART   2,256,503
THERMOSTATIC CONTROL
Original Filed April 2, 1937
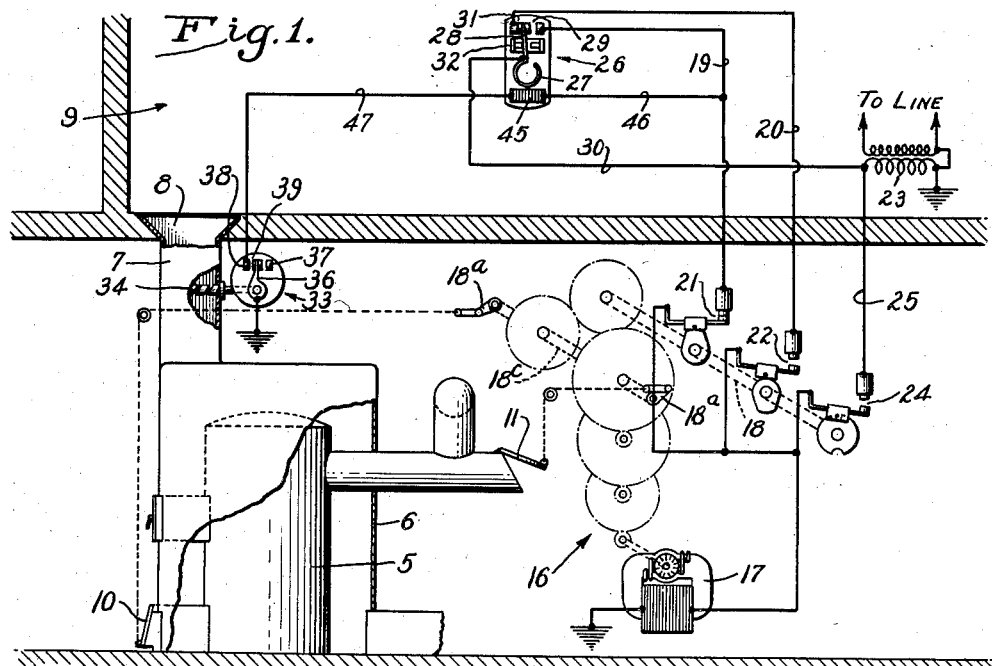
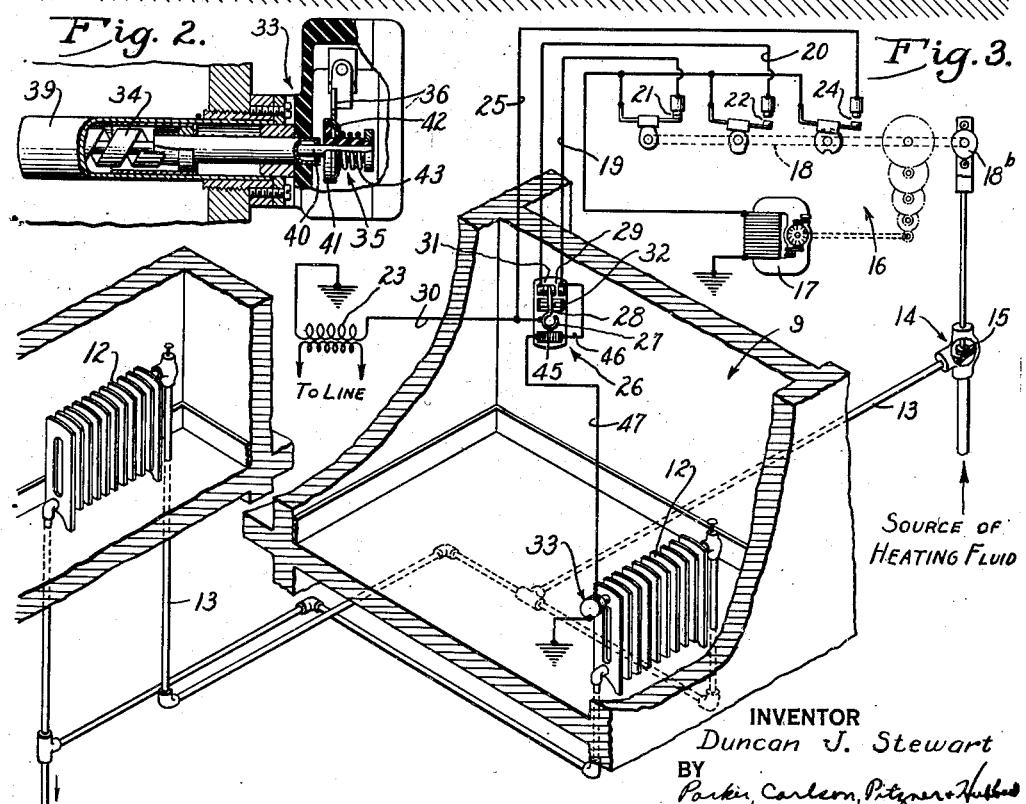
INVENTOR
Duncan J. Stewart
BY
Parker, Carlson, Pitzner & Hubbard
ATTORNEYS Patented Sept. 23, 1941

2,256,503

UNITED STATES PATENT OFFICE 2,256,503

THERMOSTATIC CONTROL

Duncan J. Stewart, Rockford, Ill., assignor to Barber-Colman Company, Rockford, Ill., a corporation of Illinois Application April 2, 1937, Serial No. 134,499
Renewed May 24, 1940

20 Claims. (Cl. 236—9)

This invention relates generally to the control of condition regulating systems and has more particular reference to controls of the general type in which the action of the controlling instrument is modified and the condition regulator reversed in anticipation of the condition change that will result from the change in the position of the condition regulator following a call by the controlling condition responsive instrument.

A general object of the invention is to provide a novel method and control mechanism for improving the uniformity of condition regulation obtainable when a control of the above general character is used with certain types of condition regulating apparatus wherein there is a substantial lag in the response of the apparatus to a change in the position of the regulator by which the apparatus is controlled.

The anticipating action in controls of the above character generally involves the use of a timing device for disabling the main condition responsive instrument before final restoration of the desired condition is detected at the instrument. A more detailed object of the present invention is to provide for rendering such a timing device active at a time approximately coincident with the beginning of the condition restoration and then to render the device ineffectual and restore the condition regulator to the control of the control instrument at a time substantially prior to the ensuing reversal in the condition of the regulating apparatus produced by the action of the anticipating device.

The invention also resides in the novel character of the mechanism employed for controlling the operation of the cycling device.

Other objects and advantages of the invention will become apparent from the following detailed description taken in connection with the accompanying drawing, in which Figure 1 is a schematic view and wiring diagram of a condition regulating system equipped with the control embodying the features of the present invention.

Fig. 2 is a fragmentary cross sectional view of one of the controlling instruments.

Fig. 3 is a schematic view and wiring diagram illustrating the application of the control to another type of system.

The invention is applicable to the control of various kinds of regulating devices for governing the operation of conditioning apparatus by which a wide variety of conditions may be maintained. For purposes of illustration, the invention is shown in the drawing and will be described herein as applied to the control of a temperature changing apparatus for maintaining the space within a building at a desired uniform temperature. I do not intend to limit the invention by such exemplary disclosure but aim to cover all modifications, alternative methods, constructions, and uses falling within the spirit and scope of the invention as expressed in the appended claims.

The general method constituting the present invention involves moving a condition regulator to one condition-changing position in response to a deviation of a controlled condition from a desired value, moving the regulator to a reverse condition-changing position after the lapse of an interval measured from the time when the condition-changing apparatus governed by the regulator becomes effective in initiating restoration of the desired condition, and, in the event that said deviation persists, again moving the regulator to said first mentioned position independently of the condition of said apparatus and after the lapse of a second time interval measured from the return of said regulator to said second position.

As applied to the control of heating apparatus of the character shown in the drawing, the present method generally stated includes the steps of increasing the supply of heat from a primary heat source to a heat transferring apparatus when the temperature at a point of control in the space being heated falls below a desired value, interrupting the supply of heat in timed relation to the initial delivery of heat to the space by the apparatus and substantially prior to the time when the increased heat supply becomes effective at the control point, and again resuming the supply of heat substantially before the resulting fall in the temperature of said apparatus provided the space temperature at the control point remains below the desired value. Preferably, the point of control above referred to is determined by the position of a controlling thermostat in the space being heated, and the interruption in the heat supply and resumption thereof is effected by raising and lowering the control point of the thermostat through the use of an auxiliary localized source of heat which influences the thermostat and is controlled in a novel manner.

The foregoing method is especially adapted for use in controlling the operation of heating systems of the on and off type wherein there is an inherent lag in the response of the heat supplying apparatus to the call of the controlling thermostat, so-called warm air heating systems being a typical example. As shown in Fig. 1, such systems usually comprise a heater 5 such as a solid fuel or other type of burner for heating a current of air which is circulated through a jacket 6 around the heater and through a duct 7 by which the heated air is discharged through an outlet 8 into a space 9 to be heated. When the burner is of the solid fuel type, the regulating device by which it is controlled takes the form of a damper 10 movable between the closed or heat-decreasing position shown and an open or heat-increasing position to vary the intensity of the fire. A check damper 11 is simultaneously operated in the reverse manner.

Fig. 3 illustrates the adaptation of the present control to a so-called zone type of steam heating system in which different parts or rooms within a selected zone of a building are heated by individual heaters such as radiators 12 located in the respective rooms and supplied with heating fluid through a common conduit 13 to which heating fluid from a primary source may be admitted under the control of a regulated device in the form of a valve 14 having a member 15 movable between open and closed positions. Other types of regulating devices may of course be employed depending on the character of the heating apparatus and the manner of transferring the heat to the space to be heated.

The regulating device which controls the increases or decreases in the heat supply in systems of the above character is usually actuated by a power operator 16 having an electric motor 17 arranged to drive a shaft 18 through cycles of fixed length during which the regulating device is alternately moved to heat-increasing and heat-decreasing positions which correspond to the open and closed positions of the damper 10 or the valve 11. The dampers 10 and 11 are actuated through the medium of cranks 18ᵃ on a shaft 18ᶜ driven at the same speed as the shaft 18. The valve member 15 is reciprocated by a cam 18ᵇ on the operating shaft 18. The opening and closing cycles, each of which comprises a half revolution of the shaft 18, are initiated by closure of starting circuits 19 and 20 for the motor respectively extending through cam operated switches 21 and 22 and common to a source of alternating current, each cycle of the operators being terminated by opening of a switch 24 in a maintaining circuit 25.

A thermostat 26 located at a proper representative point of control in the space to be heated and preferably remote from the outlet 8 or the radiators 12 at which heat is imparted to the space may be employed to initiate movement of the regulating device to heat-increasing position. The thermostat shown comprises a sensitive element 27 directly exposed to the air in the space 9 and carries a tongue 28 cooperating with a stationary contact to form a switch 29 which is closed when the temperature of the ambient air falls below that desired to be maintained as determined by the setting of the thermostat. The switch 29 is connected to the power source by a conductor 30 and interposed in the circuit 19 which when closed initiates movement of the regulating device to open position. The circuit 20 for closing the regulating device also includes the conductor 30 and is controlled by a switch 31 which is closed by the thermostatic element in response to a rise of the element temperature to a value slightly higher than that at which the switch 29 is closed. A magnetic detent 32 is associated with the magnetic tongue 28 of the thermostat to insure movement of the latter with a snap action for a reason to appear later.

The anticipating action to compensate for the lag in the heating system is obtained by shutting off of the heat substantially prior to that at which the increased rate of heat supply is felt at the thermostat, and more particularly at a time measured from the initial delivery of heat at an increased rate to the space, the latter being determined by the lag existing in the heating apparatus at the time the heat is turned on. The detection of the time of initial delivery of heat to the space is effected in the present instance through the use of an auxiliary thermostat 33 associated with the metal of the heating apparatus and arranged to indicate automatically alternate increases or decreases of predetermined small magnitudes in the temperature of the apparatus irrespective of the value of this temperature. In the system shown in Fig. 1, this thermostat is arranged to respond to temperatures within the duct 7 at some point between the jacket 6 and the outlet 8, preferably near the latter. In zone heating systems of the type shown in Fig. 3, the thermostat 33 preferably is arranged to respond to temperature changes of a selected one of the radiators in the zone. While the availability of heat for delivery to the space may be evidenced by a rise in the temperature of the radiator surface or of the air immediately adjacent the radiator, such a condition is detected in the present instance by employing a thermostat of the insertion type shown with its element 34 projecting into the outlet end of the radiator and preferably enclosed by a metallic protective tube 39 (Fig. 2).

The thermostat 33 preferably is of the electric switch type having its element 34 connected through some device, such as a friction coupling 35, to a control member 36 adapted to move through a predetermined range determined by stops 37 and 38. The control arm cooperates with the stop 38 to form a switch 39 which is closed upon the detection of a temperature rise of a few degrees, for example five, as evidenced by movement of the tongue 36 from the stop 37 into engagement with the stop 38. In the present instance, the thermostatic element 34 is in the form of an helix having one end stationarily supported and the other end fast on a shaft 40 which carries a disk 41 urged into frictional engagement with a driven disk 42 by a spring 43 so as to form the coupling 35. The parts are so adjusted that sufficient friction is developed in the coupling to turn the contact member 36 as long as the latter is free and unobstructed but to cause slippage between the coupling elements after the member engages either of the contacts while heating or cooling.

The timing mechanism by which closure of the thermostat switch 39 is utilized in turning off the heat substantially independently of the space temperature preferably includes a secondary source of heat operating in conjunction with a thermostatic element which is influenced by temperature changes at the point of control in the space being heated. In the present instance, the element 27 of the main thermostat 26 is utilized to perform this additional function, and the secondary heat source is in the form of an electric resistance coil or heater 45 which is disposed adjacent the element 27 as shown and is connected in an energizing circuit which will be described later and which is completed by the closure of the switch 39.

The capacity of the heater 45 required in order to produce proper timing of the heating cycles will vary with different types of thermostats and installations. As a general rule, the heater should, when energized, be capable of producing false heating of the element 27 of the room thermostat through its operating range in an interval of approximately five minutes. Such timing may be obtained with the thermostat shown by employing a heater having a capacity capable of heating the element 27 to a temperature approximately five degrees above that of the surrounding air.

The invention contemplates the provision of means which cooperates jointly with the thermostat switch 39 in controlling the energization of the auxiliary heater 45 and which operates to render this heater ineffectual preferably at a time approximately coincident with the shutting off or decrease in the supply of heat and at least substantially prior to the time when the thermostat 33 detects a fall in temperature and opens its switch 39. This means may take various forms and may be operated in various ways, for example in response to the movement of the regulating device to heat-decreasing position resulting from a call of the thermostat for less heat. For convenience in the wiring arrangement, it is preferred to utilize for this purpose the thermostat switch 29 which is opened as an incident to the call of the thermostat for less heat. To this end, the energizing circuit for the electric heater 45 is extended from the low voltage power source 23 through the conductor 30, the thermostat tongue 28, the switch 29, conductors 19 and 46, the electric heater 45, a conductor 47, the switch 39 of the thermostat 33 to the grounded side of the current source. In this way, energization of the heater 45 depends upon the joint closure of the switches 29 and 39 so that following a call for heat, the heater will become effectively energized in response to closure of the switch 39, the switch 29 at this time being closed. The heater will be deenergized in response to opening of the switch 29 at a time when the switch 39 is closed.

The operation of the control may be summarized as follows, it being assumed that the parts are positioned as shown in the drawing with the regulating device in heat-decreasing position and the main thermostat 26 calling for less heat. As the room temperature falls below the value which it is desired to maintain, the switch 29 will be closed which initiates a heat-increasing cycle of the power operator during which the regulating device is moved to open position. The supply of heat to the conveying mechanism is thus accelerated and eventually, depending on the prevailing lag in the heating apparatus existing at this time, will raise the temperature of the thermostatic element 34 sufficiently to effect closure of the switch 39. Since this will occur before any substantial amount of heat has been delivered to the space and, in any case, substantially prior to the time when the effect of such heat is felt at the thermostat 26, the thermostat switch 29 will be closed so that the energizing circuit for the heater 45 will be completed in response to the closure of the switch 39. Auxiliary heat is thus created by the heater 45 producing gradual false heating of the thermostatic element 27 thereby lowering the effective control point of the thermostat. The detent 32 operates to maintain the switch 29 closed and the heater 45 energized until sufficient energy has been imparted to the thermostatic element 27 to overcome the action of the detent 32, whereupon the thermostat switch 31 becomes closed at the prevailing temperature of the ambient air. This completes the starting circuit for the power operator whose shaft 18 turns through a second half revolution to move the regulating device to heat-decreasing or closed position. As an incident to closure of the switch 31, the switch 29 is opened thereby interrupting the energizing circuit for the heater 45 which permits immediate dissipation of the false heat affecting the thermostatic element 27.

If the heat delivered to and distributed in the space before the thermostat 26 has drifted back to room temperature following deenergization of the electric heater is sufficient to raise the room temperature the minute amount necessary for preventing closure of the switch 29, the switch 31 will remain closed and the regulating device will be held in off position. If, however, the room thermostat still detects a condition of underheating upon dissipation of the false heat, another heat-increasing period will be initiated immediately in response to the resulting closure of the switch 29. By this time, the variable limit thermostat switch 39 may or may not have become opened. In case it is opened, the heat-on cycle will be executed in the manner above described by the auxiliary heater 45 after the thermostat 33 has detected a five degree rise in the temperature of the heating mechanism. If, on the other hand, the switch 39 is not opened prior to the call of the room thermostat for more heat, the electric heater will be energized immediately by closure of the switch 29, the length of the heat-on period then being determined by the interval required for false heating of the thermostat 26 through its operating range.

By deenergizing the electric heater 45 in the manner above described, that is, substantially immediately when the room thermostat ceases to call for heat and independently of the switch 39, the room thermostat will be allowed to cool immediately and thus again be placed in effective control of the regulating device at a time prior to the opening of the switch 39. This avoids the possibility of the heat-off periods being prolonged to such an extent as to prevent the heating mechanism from properly satisfying a heavy demand for heat or responding to a rapidly changing demand. This action is particularly advantageous in systems and under conditions where, after the regulating device has moved to heat-decreasing position, heat continues to be delivered at a slow rate sufficient to maintain the thermostat switch 39 closed but not sufficient to supply a heavy demand or respond to a sudden increase in demand. Such conditions may arise in systems of which those illustrated are typical.

The thermostatic control above described operates to effect cyclic operation of the regulating device in a heating system to cause heat to be delivered to the space intermittently and at an average rate closely approximating the prevailing rate of heat loss from the space thereby resulting in a decrease in the tendency of the room temperature to overrun in mild weather. At the same time, the possibility of underrunning of the room temperature due to the action of the cycling mechanism under severe or rapidly changing weather conditions is effectually prevented.

It will thus be seen that through the use of the present invention, the cycling mechanism involving the electric heater and the thermostat 35 may be employed effectively in governing the operation of a wide variety of heating systems to maintain accurate regulation of the room temperature.

This application is a continuation in part of my application Serial No. 30,275, filed July 8, 1935.

I claim as my invention:

1. In combination with a warm air heating system having a heater and a duct for controlling the circulation of air into heat-exchanging relation to said heater and delivering the heated air to a space to be heated, a regulator movable between heat-increasing and heat-decreasing positions to control the operation of said heater, a thermostat in said space controlling the operation of said regulator, electrically operated means associated with said thermostat and adapted when energized to decrease the effective control point of said thermostat, and means operating to effect energization of said electrically operated means in response to a rise in the duct temperature following the call of said thermostat for heat and to deenergize said electrically operated means when said thermostat ceases to call for heat.

2. The combination with a heating system having a source of heat and means for transferring heat from said source to a space to be heated, of a regulator movable between heat-increasing and heat-decreasing positions to control the delivery of heat by said transfer means, a thermostat in said space controlling the operation of said regulator, electrically operated means associated with said thermostat and adapted when energized to decrease the effective control point of said thermostat, and means operating to effect energization of said electrically operated means in response to a rise in the temperature of said transfer means following the call of said thermostat for heat and to deenergize said electrically operated means when said thermostat ceases to call for heat.

3. The combination with a heating system having a source of heat and means for transferring heat from said source to a space to be heated, of a regulator movable between heat-increasing and heat-decreasing positions to control the delivery of heat by said transfer means, a thermostat in said space controlling the operation of said regulator and including a switch adapted to be closed when the space temperature is below a predetermined value, a thermostat responsive to temperature changes of said transfer means and including a switch adapted to be closed in response to a rise in temperature, and electrically operated means adapted to be energized by the joint closure of said switches and acting when energized to lower the effective control point of said space thermostat.

4. The combination with a heating system having a source of heat and means for transferring heat from said source to a space to be heated, of a regulator movable between heat-increasing and heat-decreasing positions to control the delivery of heat by said transfer means, a thermostat in said space controlling the operation of said regulator and including a switch adapted to be moved to one circuit controlling position when the space temperature is below a predetermined value, a thermostat responsive to temperature changes of said transfer means irrespective of the temperature values and adapted to detect a rise in temperature including a switch, and an electric heating means associated with said space thermostat for heating the same to a false temperature and arranged to be energized by the joint action of said switches.

5. In combination with apparatus for supplying heat to a space to be heated, a thermostat responsive to temperature changes in said space and governing the operation of said apparatus to turn the heat on and off, an electrically operated device adapted when energized to accelerate the action of said thermostat in turning off the heat, an auxiliary thermostat associated with said apparatus and adapted to cause energization of said device following turning on of the heat and upon detection of a rise in the temperature of the apparatus irrespective of the temperature value, and means operating to effect deenergization of said device prior to detection of a fall in the temperature of said apparatus following turning off of the heat.

6. In a heating system, a heater, means for transferring heat from said heater to a space to be heated, a regulator controlling the delivery of heat to said transfer means and movable between heat-increasing and heat-decreasing positions, a thermostat controlling the operation of said regulator to maintain a uniform temperature in said space, a timing mechanism adapted when rendered operative to cause movement of said regulator to heat-decreasing position after the lapse of a time interval, a second thermostat responsive to rises and falls in the temperature of said transfer means, means controlled by said second thermostat to initiate operation of said timing mechanism when said second thermostat detects a temperature rise, and means controlled by said space thermostat to restore said regulator to the control thereof when the latter thermostat ceases to call for heat.

7. In combination with apparatus for supplying heat to a space to be heated, a thermostat responsive to temperature changes in said space remote from said apparatus and governing the operation of said apparatus, an electrically operated device adapted when energized to accelerate the action of said thermostat in turning off the heat, means immediately associated with said apparatus and operable to cause energization of said device approximately coincident with the initial delivery of heat to said space following turning on of the heat, and means operating to effect deenergization of said device substantially coincident with the turning off of the heat.

8. In a heating system having heating apparatus for supplying heat to a space to be heated, the combination of a regulating device movable to heat-increasing and heat-decreasing positions to govern the supply of heat by said apparatus, a thermostat controlling said device to cause movement thereof to heat-decreasing position in response to a rise in the thermostat temperature above a predetermined value, an electric heater associated with said thermostat and acting when energized to effect false heating of the thermostat, means effecting energization of said heater in response to a change in the condition of said heating apparatus following movement of said device to heat-increasing position and irrespective of the value of such condition, and means operating independently of the condition of said last mentioned means and as an incident to movement of said device to heat-decreasing position to effect deenergization of the heater.

9. In combination with a heating system having a heating apparatus for supplying heat to a space to be heated, a device in control of said heating means for selectively turning the supply of heat on and off, thermostatic means in control of said device for turning on the heat in response to a fall in the space temperature to a predetermined first value, said thermostatic means controlling said device to turn off the heat in response to the detection of a temperature value which is higher than said first value, electrical means which when energized modifies the action of said thermostatic means to cause the same to turn off the heat before the space temperature rises to said second value, and means for effectively energizing said electrical means following turning on of the heat and after the lapse of a substantial time interval determined by the prevailing lag in said heating apparatus and deenergizing the electrical means approximately coincident with the turning off of the heat.

10. In a heating system having mechanism for delivering heat to a space to be heated, the combination of a thermostat remote from said mechanism and operable to govern the supply of heat by said mechanism, a timer acting when set in operation to cause the supply of heat to be turned off after the lapse of a time interval, an independent thermostat immediately associated with said mechanism and acting to initiate operation of said timer approximately coincident with the initial delivery of heat by said mechanism following the call of said first mentioned thermostat for heat, and means operating independently of said second thermostat to interrupt the operation of said timer substantially prior to the detection of a decrease in the heat supply after said first mentioned thermostat has ceased to call for heat.

11. In a heating system, the combination of apparatus for delivering heat to a space to be heated, a regulator controlling such delivery, thermostatic means controlling said regulator to increase and decrease the heat delivery and maintain a substantially uniform temperature in said space, said thermostatic means being located remote from the point of delivery of heat to the space, an electric heater associated with said thermostatic means for producing false heating thereof, and means including a slip type thermostat responsive to a different temperature value than said thermostatic means and operating subsequent to a call of the thermostatic means for heat to effectually energize said heater after a time interval proportional to the prevailing temperature lag in said apparatus but substantially prior to a resulting increase in the space temperature adjacent said thermostatic means, said energizing means being rendered ineffectual at a time substantially prior to the fall in the temperature of said apparatus resulting from a decrease in the heat delivery caused by false heating of said thermostatic means.

12. In a heating system, the combination of apparatus for delivering heat to a space to be heated including a regulating device, thermostatic means controlling said device to increase and decrease the supply of heat by said apparatus, means responsive to rises and falls in the temperature of said apparatus independently of the temperature value and operable to reduce the effective control point of said thermostatic means progressively when heat becomes available in said apparatus for delivery to said space, and means for rendering said last mentioned means ineffectual at a time approximately coincident with the call of said thermostatic means for less heat.

13. In a heating system having mechanism for delivering heat to a space to be heated, the combination of a thermostat operable to govern the supply of heat by said mechanism, an electric heater acting when effectively energized to cause the supply of heat to be turned off after the lapse of a time interval, means for detecting rises and falls in the temperature of said mechanism independently of a particular temperature value and operable to render said heater active approximately coincident with the initial delivery of heat by said mechanism following the call of said first mentioned thermostat for heat, said second thermostat and said heater being rendered ineffectual at a time substantially prior to the detection of a decrease in the heat supply after said first mentioned thermostat has ceased to call for heat.

14. The method of controlling the supply of heat to a mechanism for transferring heat to a space to be heated, said method comprising increasing the supply of heat to said mechanism when the temperature at a point of control in said space remote from the point of delivery of heat by said mechanism falls below a predetermined value, initiating an auxiliary localized supply of heat to said space adjacent said point of control upon a resulting rise in the temperature of said apparatus adjacent the point of delivery of heat to the space and before the increased supply of heat has become effective at said point of control, and interrupting said auxiliary source of heat and decreasing the supply of heat to said mechanism approximately simultaneously when the temperature at said point of control has been increased by said auxiliary heat source to a predetermined value higher than said first mentioned value.

15. The method of controlling the supply of heat to a mechanism for transferring the heat to a space to be heated, said method comprising increasing the supply of heat to said mechanism when the temperature at a point of control in said space remote from the point of delivery of heat by said mechanism falls below a predetermined value, initiating an auxiliary localized supply of heat to said space adjacent said point approximately coincident with the initial delivery of heat at an increased rate to the space, decreasing the supply of heat to said mechanism when the temperature at said point of control has been increased by said auxiliary heat source to a value higher than said first mentioned value, and interrupting said auxiliary source of heat at a time substantially prior to the resulting decrease in the temperature of said apparatus.

16. The method of controlling the supply of heat to a mechanism for transferring heat to a space to be heated, said method comprising increasing the supply of heat to said mechanism when the temperature at a point of control in said space remote from the point of delivery of heat by said mechanism falls below a predetermined value, initiating an auxiliary localized supply of heat to said space adjacent said point approximately coincident with the initial delivery of heat at an increased rate, decreasing the supply of heat to said mechanism when the temperature at said point of control has been increased by said auxiliary heat source to a predetermined value higher than said first mentioned value, and interrupting said supply of auxiliary heat at a time approximately coincident with the decrease in the supply of heat to said mechanism.

17. The method of increasing and decreasing the supply of heat to a mechanism by which heat is transferred to a space to be heated, said method comprising initiating an increase in the supply of heat to said mechanism when the temperature at a point of control located in said space remote from the point of delivery of heat thereto by said mechanism falls below a predetermined value, decreasing the supply of heat to said mechanism when the temperature at said control point rises to a second value higher than said first mentioned value, initiating the supply of auxiliary heat at said point of control upon the initial increase in the delivery of heat to said space following an increase in the supply of heat to said mechanism and before the effect of said increased supply is felt at said control point, and interrupting said auxiliary heat supply substantially coincident with the rise in temperature at said control point to said second value.

18. The method of governing a regulator controlling a condition-changing apparatus which comprises moving said regulator to one condition-changing position in response to a condition deviation in one direction from the desired value at a point of control remote from said apparatus, moving said regulator to a reverse condition-changing position before said control point has been restored to said value and after the lapse of an interval measured from the time when said apparatus becomes effective in initiating restoration of the desired condition, and again moving said regulator to said first position independently of the condition of said apparatus in the event that said deviation persists after the lapse of a second interval measured from the return of said regulator to said second position.

19. The combination of a regulator movable between condition-increasing and condition-decreasing positions, conditioning apparatus controlled in accordance with position changes of said regulator, a condition-responsive instrument controlling said regulator in response to deviations of a controlled condition from a desired value, means operable independently of any predetermined condition value of said apparatus and operable to detect the initial effective restoring action of said apparatus following movement of said regulator to one of said positions in response to a condition deviation detected by said instrument, a timing device rendered operative in response to the detection of such initial restoring action and acting to reverse the position of said regulator after a lapse of a time interval, and mechanism for disabling said detecting means and causing said timing device to restore said regulator to the control of said instrument irrespective of the condition of said detecting means but after the lapse of a second time interval measured from said reversal in the position of the regulator.

20. The combination of condition-changing apparatus, a condition-responsive instrument controlling said apparatus to cause condition-increasing and condition-decreasing action of the apparatus in response to opposite deviations of the controlled condition to be from a desired value, means responsive to the beginning of actual restoration of said condition toward said desired value while said member is in one of said positions and independently of any predetermined condition value of said apparatus to alter the control by said instrument and reverse the action of said apparatus after the lapse of a time interval, and means acting after the lapse of a time interval following such reversal to restore said apparatus to the control of said instrument independently of said last mentioned means.

DUNCAN J. STEWART.

CERTIFICATE OF CORRECTION.

Patent No. 2,256,503. September 23, 1941.
DUNCAN J. STEWART.

It is hereby certified that error appears in the above numbered patent requiring correction as follows: In the grant, line 6, and in the heading to the printed specification, line 2, title of invention, for "THERMOSTATIC CONTROL" read --CONDITION CONTROL SYSTEM--; page 6, second column, line 28, for the words "controlled condition to be" read --condition to be controlled--; and that the said Letters Patent should be read with this correction therein that the same may conform to the record of the case in the Patent Office.

Signed and sealed this 9th day of December, A. D. 1941.

(Seal)

Henry Van Arsdale,
Acting Commissioner of Patents.